United States Patent [19]
Mickler

[11] 3,794,976
[45] Feb. 26, 1974

[54] METHODS AND APPARATUS FOR ACOUSTICALLY INVESTIGATING EARTH FORMATIONS USING SHEAR WAVES

[75] Inventor: Brian E. Mickler, Houston, Tex.

[73] Assignee: Schlumberger Technology Corporation, New York, N.Y.

[22] Filed: May 30, 1972

[21] Appl. No.: 257,748

[52] U.S. Cl. ... 340/15.5 BH, 181/0.5 BE, 340/18 R, 340/18 P
[51] Int. Cl. ............................................. G01v 1/40
[58] Field of Search ......... 340/15.5 BH, 18 R, 18 P, 340/15.5 SW; 181/0.5 BH

[56] References Cited
UNITED STATES PATENTS
| | | | |
|---|---|---|---|
| 3,363,719 | 1/1968 | Venghiattis | 340/15.5 SW |
| 3,485,317 | 12/1969 | Patel | 181/0.5 BE |
| 3,231,041 | 1/1966 | Kokesh | 340/18 R |
| 3,339,666 | 9/1967 | McDonald | 340/18 R |
| 3,526,874 | 9/1970 | Schwartz | 340/18 R |
| 3,542,150 | 11/1970 | Youmans | 340/18 R |

FOREIGN PATENTS OR APPLICATIONS
1,141,245  12/1962  Germany ..................... 340/15.5 SW Primary Examiner—Maynard R. Wilbur
Assistant Examiner—H. A. Birmiel
Attorney, Agent, or Firm—Ernest R. Archambeau, Jr.; William R. Sherman; Stewart F. Moore

[57] ABSTRACT

In the representative embodiments and modes for practicing the invention disclosed herein, one or more highly-damped acoustic transmitting transducers are arranged for respectively subjecting an adjacent wall surface of a borehole to an almost-instantaneous burst of acoustic energy having a duration which is so short that it may be considered to be a single impulse of acoustic energy in the borehole environment for propagating acoustic shear waves through the formation for reception by a broad-band acoustic receiving transducer disposed adjacent to a remote wall surface of the borehole. The electrical signals produced by these shear waves are processed to obtain measurements which are characteristic of anomalies such as fractures in the earth formation traversed by the acoustic waves.

44 Claims, 11 Drawing Figures 3,794,976

METHODS AND APPARATUS FOR ACOUSTICALLY INVESTIGATING EARTH FORMATIONS USING SHEAR WAVES

The various acoustic investigation techniques proposed heretofore for detecting fractures in earth formations penetrated by a borehole generally involve the transmission of acoustic energy into the earth formations surrounding a borehole, with this energy being received by a distant acoustic transducer and processed for producing electrical signals which are representative of the presence or absence of fractures in the path of the acoustic waves. As is well known, acoustic energy is generally propagated through earth formations in the form of both compressional waves as well as shear waves. Since acoustic shear waves are significantly attenuated by even minute fractures or cracks crossing the acoustic path between the transmitter and the receiver, measurements of these shear waves are particularly useful in determining the presence of such anomalies.

Accordingly, as described in U.S. Pat. No. 3,406,776, one typical fracture-detecting tool employs a first acoustic transmitter for directing a narrowly-defined acoustic beam into the borehole wall at a selected angle of incidence relative thereto to maximize the shear waves which are produced in the earth formations and propagated therein along an arcuate path generally following the circumference of the borehole. After traveling partway around the borehole wall, the acoustic waves are received by a second acoustic transducer arranged for producing an electrical signal that is representative of the amplitude of the acoustic energy being received. Although tools employing this arrangement have been useful, it has nevertheless been found that these so-called "steered beam" tools will not always reliably detect fractures in certain types of earth formations which are often encountered. For example, the acoustic gain of these steered beam tools has been found to vary appreciably with the acoustic travel times (in time units per unit of distance) of the shear waves in various types of earth formation materials. Secondly, with the higher operating frequencies typically employed with these steered beam tools to minimize the physical size of the transducers, the resulting matrix scattering of this high-frequency acoustic energy in the formations significantly affects the attenuation of the acoustic energy. As a result, these steered beam tools are often found to be unduly sensitive to even minor lithological changes in various types of formations.

Accordingly, it is an object of the present invention to provide new and improved methods and apparatus for acoustically investigating subsurface well bore conditions to obtain measurements which are representative of the nature or character of such conditions.

It is a further object of the present invention to provide new and improved methods and apparatus for acoustically investigating earth formations to reliably detect formation anomalies such as minute cracks or fractures.

These and other objects of the present invention are attained by providing new and improved methods and apparatus for directing an almost-instantaneous burst of highly-damped acoustic energy into a first location on a well bore wall for propagating transverse shear-wave acoustic energy through the adjacent well bore materials toward a wide-band acoustic receiver located adjacent to a second remote location on the well bore wall for obtaining measurements representative of the well bore condition under investigation.

The novel features of the present invention are set forth with particularity in the appended claims. The invention, together with further objects and advantages thereof, may be test understood by way of the following description of exemplary apparatus and methods employing the principles of the invention as illustrated in the accompanying drawings, in which:

Figures 1, 2, 3:
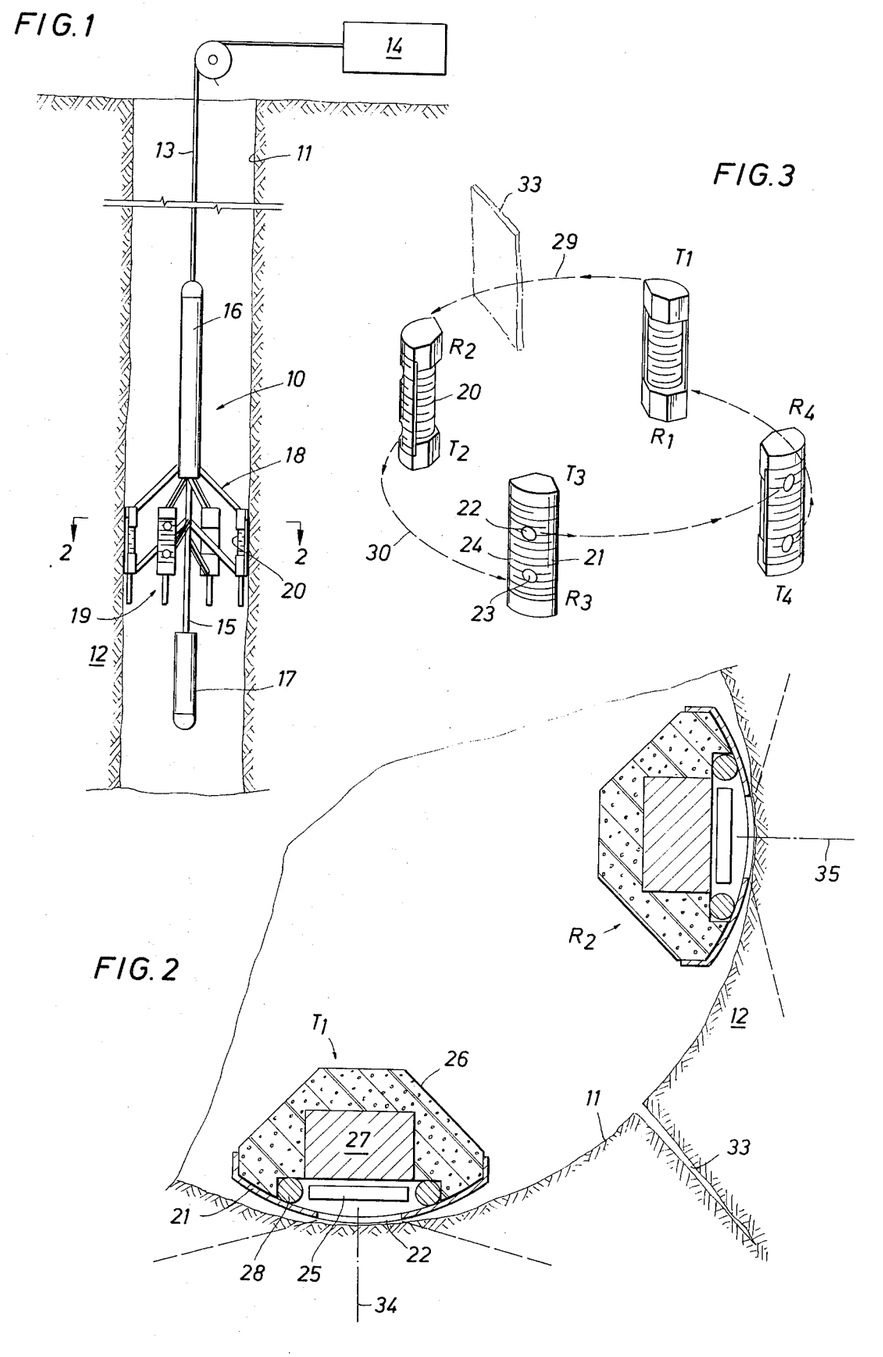
FIG. 1 depicts a new and improved well-logging tool incorporating the principles of the present invention as it will appear within a typical borehole.
FIG. 2 is a partial cross-sectional view taken along the lines 2—2 in FIG. 1.
FIG. 3 schematically represents a preferred transducer arrangement for the new and improved apparatus shown in FIG. 1.

Turning now to FIG. 1, a preferred embodiment of a new and improved well logging tool 10 arranged in accordance with the present invention is depicted as this tool will appear while suspended within a borehole 11 penetrating various earth formations, as at 12, by a typical logging cable 13 coupled to selected surface equipment 14. As illustrated, the tool 10 includes an elongated body 15 having one or more fluidly-sealed enclosures, as at 16 and 17, arranged thereon for the subsurface electronic circuitry as well as the downhole control circuits of the tool. In the preferred embodiment of the tool 10, four selectively-extendible arm assemblies, as at 18, are cooperatively arranged at equal circumferentially-spaced intervals around the tool body 15 and, as best seen in FIGS. 1 and 3, respectively carry formation-investigating means 19 such as a pair of vertically-spaced, outwardly-directed acoustic transducers T and R respectively arranged for selectively emitting and receiving acoustic energy in a selected radial direction. To minimize direct interaction therebetween, each pair of the transducers R and T on a given arm assembly 18 are mounted on the opposite ends of an acoustical isolating member such as an upright circumferentially-slotted tubular support, as at 20, cooperatively arranged in accordance with the principles disclosed in U.S. Pat. No. 3,191,141 for significantly delaying the travel of acoustic energy along the isolating support. As best seen in FIG. 3, the outer faces of each vertically-spaced pair of transducers R and T are covered by an upright metal plate 21 having openings, as at 22 and 23, in front of each transducer and a plurality of transverse slots, as at 24, cooperatively arranged therein in the same manner as disclosed in U.S.

Pat. No. 3,191,141 for minimizing interference between the two transducers.

As best seen in FIG. 2, each of the highly-damped directional transducers $R_1$-$R_4$ and $T_1$-$T_4$ is comprised of an electro-acoustical element 25 of a low-Q piezoelectric material, such as for example lead metaniobate, which is freely mounted in a cavity formed in an acoustically-damped body, as at 26, which is preferably composed of a high acoustic impedance material such as a plurality of spatially-distributed lead balls encapsulated in a suitable plastic compound such as epoxy. To further block any rearwardly-directed acoustic energy, the directional transducers R and T further include a cylinder 27 of a suitable sound-attenuating material such as lead which is embedded in the transducer body 26 immediately to the rear of the piezoelectric disc 25. Electrical leads, as at 28, are suitably arranged in the body 26 for supplying electrical power to the transmitting transducers T as well as for receiving electrical signals from the receiving transducers R.

Accordingly, it will be appreciated that by virtue of the above-described arrangements, the mechanical Q of the transmitting transducers T as well as the receiving transducers R is exceptionally low. In the preferred embodiment of the present invention, the transducers R and T are cooperatively arranged so that their mechanical Q is less than 1.0. The geometry of the receiving transducers R is selectively arranged to respectively make them hemispherically directional over a wide range of frequencies below about 100-KHz. That is to say, each of the transducers R will respond to acoustic energy below 100 KHz directed theretoward along substantially any radius of an imaginary hemispherical generatrix defined by an imaginary radius having an end point at the center of the piezoelectric element 25 and extending outwardly or forwardly of the front surface of the element. Similarly, the resonant frequency and mechanical Q of the transmitting transducers T are chosen so that, upon their step or edge energization, the compressional energy emitted thereby will be essentially completed within such a short time interval that this energy may be considered as being substantially equivalent to a single impulse of acoustic energy which is directed into the earth formation 12. It should be recognized, however, that so long as their mechanical Q is exceptionally low, the resonant frequency of the transmitting transducers T can be unrelated to the operating frequency of the receiving transducers R so long as the total duration of each transmitted pulse does not exceed the time durations described hereinafter. For example, in one embodiment of the present invention, it was preferred to use identical elements for the piezoelectric discs 25 in each of the transducers T and R with the result being that the receiving transducers were responsive to acoustic energy below about 100-KHz and the transmitting transducers had a resonant frequency of about 400-KHz.

Turning now to FIG. 3, in the preferred embodiment of the new and improved logging tool 10, the transducers $R_1$-$R_4$ and $T_1$-$T_4$ are alternately disposed on the several extendible arm assemblies 18 so that acoustic energy successively emitted from each of the transmitting transducers T and transmitted through the adjacent portion of the formation 12 will be detected by its associated receiving transducer R along an arcuate path lying in a plane which is generally perpendicular to the longitudinal axis of the logging tool. The longitudinal axis of the tool 10 will, of course, generally be either coincidental with or closely parallel to the axis of the borehole 11. For example, as illustrated in FIG. 3, acoustic energy emitted by the transmitting transducer $T_1$ on the first one of the extendible arm assemblies 18 will travel through the formation 12 along a circumferential path, such as at 29, for reception by the receiving transducer $R_2$ which is mounted on the second one of the arm assemblies so as to be located in substantially the same transverse plane as this transmitting transducer. Similarly, the transmitting transducer $T_2$ is cooperatively arranged on their common support 20 below the transducer $R_2$ for emitting acoustic energy through the formation 12 along a path, as at 30, for reception by the receiving tranducer $R_3$ on the lower portion of the tubular support on the third one of the extendible arm assemblies 18.

Figures 4, 5:
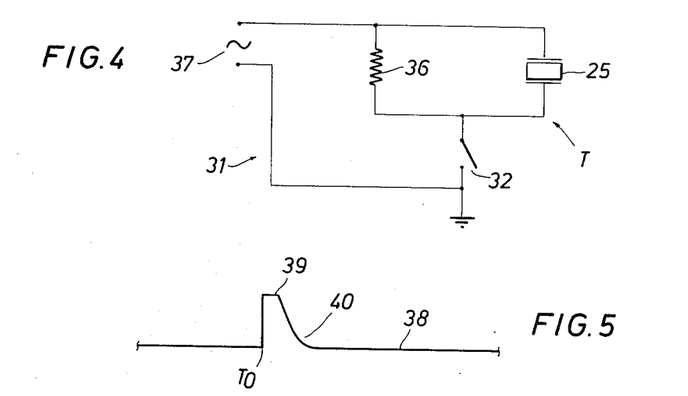
FIG. 4 is a schematic representation of one portion of the circuitry employed with the new and improved apparatus of the present invention.
FIG. 5 schematically illustrates the excitation signal of the circuit shown in FIG. 4.

As shown in FIG. 4, in the present invention the transmitting transducers T are cooperatively coupled to broadband excitation circuits, as at 31, for selectively energizing each transmitting transducer in such a fashion that only an extremely short burst of acoustic energy will be directed into the borehole wall each time its associated switching device, as at 32, functions. It must be recognized, therefore, that the duration of these bursts must be selected to direct only highly-damped acoustic energy into the borehole wall for reception by the receiving transducers, R.

To appreciate the significance of the necessity to produce only such highly-damped acoustic energy, consider the usual narrow-band techniques for directing acoustic energy into an earth formation which, as is known, produce relatively-undamped acoustic energy. Thus, with these prior techniques, a distant receiving transducer receives early-arrival compressional energy produced by the latter portions of an undamped transmitted acoustic wave while simultaneously receiving the slower arrivals of shear-wave energy that was produced by the early portions of the transmitted acoustic wave. The result of these prior techniques is, therefore, that the acoustic arrival detected by the receiving transducer is a mixture of both compressional and shear-wave components.

To understand why these prior techniques which produce this mixture of energy components have been unsatisfactory for detecting anomalies such as fractures, an explanation of these techniques is believed to be in order as an aid in recognizing the significance of the present invention. First of all, these prior techniques typically employ arrangements which transmit sinusoidal acoustic energy into the adjacent earth formations during a finite time interval, $\Delta\tau = \tau_2 - \tau_1$. Thus, at the beginning or starting time $\tau_1$ of this time interval $\Delta\tau$, compressional acoustic energy begins traveling toward the distant receiving transducer and will first arrive at this distant transducer at a time, $\tau_1 + St_c$, which is determined by the distance or spacing, S, between the transmitting and receiving transducers and the travel time (in time units per unit of distance) of compressional acoustic energy in the intervening earth formation, $t_c$. The compressional energy will, of course, thereafter continue to be received by the receiving transducer for a continuous time interval corresponding to the time interval $\Delta\tau$ and will stop at a later time $\tau_2 + St_c$.

At the beginning time, $\tau_1$, shear-wave acoustic energy will also begin traveling toward the distant receiving transducer and will, of course, first be detected thereby at a time, $\tau_1 + St_s$, which is determined by the product of the spacing, S, and the travel time (in time units per unit of distance) of shear-wave acoustic energy, $t_s$, in the earth formation. As is known, however, the travel time of shear-wave energy is about 1.8 times greater than that of compressional energy. Thus, for any given set of parameters, the compressional energy wave initiated at time $\tau_1$ will arrive at the receiving transducer before the arrival of the shear-wave energy initiated at time $\tau_1$; and it will be at some later time that the shear-wave energy initiated at time $\tau_1$ will arrive at the receiver. Similarly, the compressional energy initiated at time $\tau_2$ will also arrive at the receiver ahead of the shear-wave energy initiated at the same time.

It has been found, therefore, that with the typical acoustic tools employed heretofore, the usual situation is that the shear-wave energy initiated at time $\tau_1$ will arrive at the receiver after the arrival of the compressional energy initiated at time $\tau_1$ and before the arrival of the compressional energy initiated at time $\tau_2$. The shear-wave energy initiated at time $\tau_2$ will, of course, not arrive at the receiver until after the arrival of the compressional energy initiated at time $\tau_2$. Accordingly, such typical arrangements will result in the receiver sequentially detecting first only compressional energy during the time interval between the arrivals of first the compressional energy and then the shear-wave energy respectively initiated at time $\tau_1$; secondly, both compressional and shear-wave energy during the time interval between the arrivals of the shear-wave energy initiated at time $\tau_1$ and the compressional energy finally initiated at time $\tau_2$; and subsequently only shear-wave energy thereafter until the arrival of the shear-wave energy initiated at time $\tau_2$. It will, of course, be appreciated that this results in an extremely complex received waveform particularly during the just-described second period where the trailing portion of the compressional energy is overlaying the leading portion of the shear-wave energy.

Although it would seem that this overlapping of compressional and shear-wave energy could readily be avoided by either increasing the spacing between associated receiving and transmitting transducers or significantly increasing the operating frequency so as to reduce the time interval of transmission, $\Delta\tau$, of the shear-wave energy for achieving a distinct separation in the arrivals of the two forms of energy. However, it has been found that neither technique is satisfactory. Instead, it has been found that each of these proposed techniques will introduce undesirable variations of shear amplitude due to changes in formation lithology which can mask or obscure the presence of fractures or other formation anomalies of interest.

Accordingly, in keeping with the objects of the present invention, it has been found that the received compressional energy can be sufficiently separated from the received shear-wave energy by selecting the duration of the broad-band transmitted acoustic energy, $\Delta\tau$, to be no greater than about 0.8 $St_c-\mu$ seconds, where S is the spacing between the transducers T and R. With the transducers T and R spaced circumferentially as shown in FIG. 3, $\Delta\tau$ should not exceed 0.63 $t_cD-\mu$ seconds, where D is the average diameter of the borehole 11. This selection has been found to provide an acceptable isolation between the compressional and shear energy received by each of the receiving transducers $R_1-R_4$ so that the shear-wave energy can be examined over a broad band of frequencies rather than by the narrow-band techniques employed heretofore. By use of this unique relationship, it will be recognized that the maximum duration of the bursts of acoustic energy respectively developed by the transmitting transducers T will be in the order of less than 20-$\mu$ seconds for the usual diameters of boreholes as at 11. As a result, in the present invention, these extremely-short bursts of broad-band acoustic energy which are directed into the borehole wall by the transmitting transducers T are arranged to have a duration which is so short (less than 20-$\mu$ seconds) that there will be no latter portions of compressional energy arriving at the receiving transducers R to interfere with the reception of the slower shear-wave energy. This, therefore, enables the short-spaced circumferential array shown in FIG. 3 to be employed.

It should also be noted at this point that by arranging the geometry of the receiving transducers R so that the spatial reception of acoustic energy over a wide frequency range approximates that of a hemispherically-omnidirectional receiver, the performance of the new and improved logging tool 10 will be relatively unaffected by irregularly-shaped or rugose borehole walls. By way of explanation, it will be appreciated that with an irregular or rugose borehole wall, acoustic energy leaving such a wall will be directed into the borehole in a widely-scattered pattern. With narrowly-directed receiving transducers such as those typically used with the previously-mentioned steered beam tools, a significant portion of this scattered energy would not be received by such narrowly-directed receivers. The receiving transducers, R, of the present invention are, therefore, not affected by scattering energy by virtue of their hemispherically-omnidirectional design.

It will, of course, be recognized from FIG. 3 that whenever an associated pair of the transducers, as at $T_1$ and $R_2$, are straddling a formation fracture, as at 33, which is either adjacent to or emerges at the wall of the borehole 11, the progagation of acoustic energy along the arcuate path 29 lying between these two transducers will be correspondingly affected. Conversely, if the acoustic path, as at 30, lying between an associated pair of transducers, as at $T_2$ and $R_3$, does not then cross a fracture, the transmission of acoustic energy between the pair of transducers will be subject to far less attenuation than that being experienced by the acoustic energy being transmitted between the transducers $T_1$ and $R_2$.

It will be appreciated, therefore, that the net energy received by each of the receiving transducers R after each firing of their respectively-associated transmitting transducer T is a function only of the length of the acoustic path between these two transducers (as determined by the arcuate spacing, S, between these associated transducers), the attenuation due to losses in the particular formation materials lying between these two transducers, and the attenuation due to reflections from any impedance discontinuity (such as provided by the fracture 33) in the earth formations 12 between the transducers. Thus, if the earth formation 12 lying at any given moment between the transducers, as at $T_1$ and $R_2$, is composed of substantially uniform materials having no discontinuities, it can be shown that the transmission of acoustic energy therebetween is roughly proportional to:

$$e^{-\alpha s} \quad \text{(Eq. 1)}$$

where,

S = the T–R spacing; and

α = a frequency-sensitive attenuation constant of the earth formations. In general, α increases with an increase in frequency.

Accordingly, in accordance with the principles of the present invention, since the spacing, S, is relatively small, the exponent αS of Equation 1 will be substantially small for the values of α which are typically encountered in most earth formations at frequencies below about 100-KHz. Hence, the acoustic energy received by the transducers $R_1$–$R_4$ will not be significantly affected by variations in formation lithology. In this manner, the new and improved logging tool 10 of the present invention has been found to be most responsive to impedance discontinuities in the earth formation 12 such as will be caused by fractures as at 33.

As shown in FIG. 2, by respectively disposing each of the transmitting transducers for operation along an axis (as at 34 for the transducer $T_1$) which is substantially at right angles to the reception axis, as at 35, of its associated receiving transducer, as at $R_2$, little or none of the compressional acoustic energy emitted by the transmitting transducer reaches the receiving transducer. As a result, it is believed that there is an effective dispersion of transmitted longitudinal compressional energy to transverse shear-wave energy and pseudo-Rayleigh acoustic energy during the circumferential propagation of energy through the formation 12 from the transmitting transducers T to the receiving transducers R. Thus, in the practice of the present invention, it is these transverse forms of shear energy and pseudo-Rayleigh acoustic energy which are propagated about the formation in the somewhat-arcuate circumferential paths, as at 29 or 30, to the receivers R.

As previously mentioned, it is essential for the purposes of the present invention that the transmitting transducers T be energized so as to produce only a very short burst of acoustic energy into the borehole wall each time they are energized. To accomplish this broad-band excitation of the transmitting transducers T, each transmitting transducer is coupled into broad-band excitation circuits such as that schematically illustrated at 31 in FIG. 4. As shown there, the piezoelectric disc 25 is shunted by a resistor 36 and coupled across a source of excitation voltage 37 by means of the rapidly-operable switching device 32 such as a SCR. Thus, as graphically represented by the excitation curve 38 in FIG. 5, each of the transducers T is cooperatively arranged for excitation by their respective circuits 34 so as to be energized for only extremely short intervals of time (as shown by the brief peaks as at 39) which are preferably in the order of only 1-microsecond in duration. As further shown, by example at 40 in FIG. 5, the values of the resistors 36 are respectively selected so that the decay of each transmitter excitation signal will be at a much slower rate than its substantially-instantaneous rise time. This further assures that no undamped acoustic energy is produced.

Figure 6A:
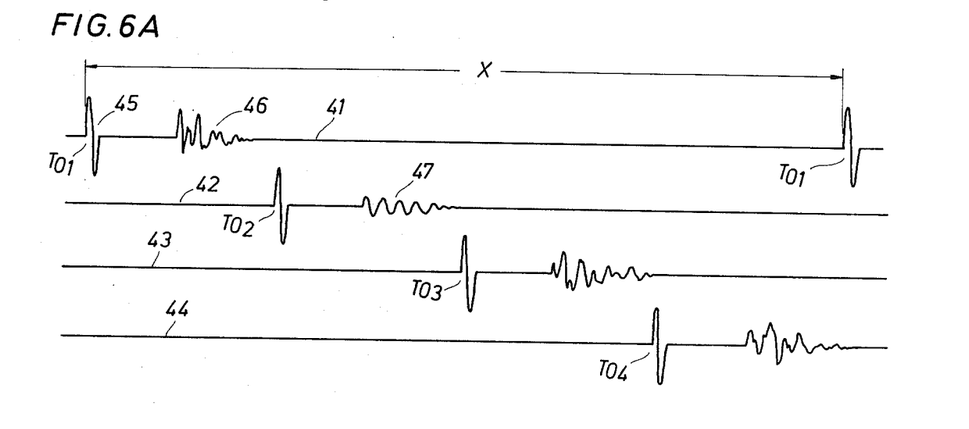
FIG. 6A–6C depict typical waveforms which will be present in various stages of the circuitry of the new and improved tool shown in FIG. 1.
Figure 6B:
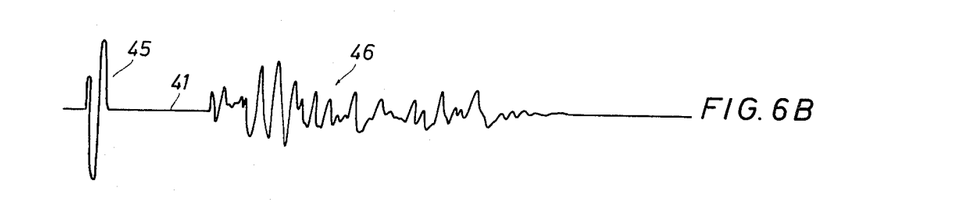
Figure 6C:
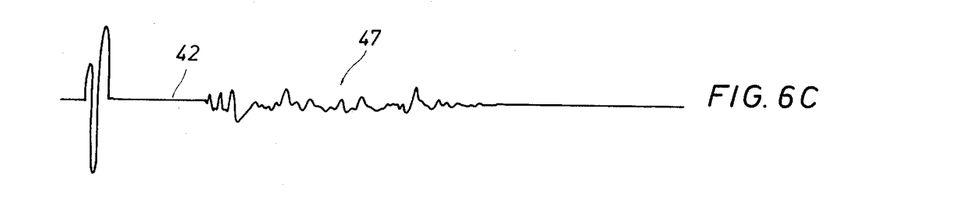

As shown by the several curves 41–44 in FIG. 6A, it is also essential to the present invention that the repetition rate or firing rate of the four transducers T be selected to have a sufficiently long period X to insure that acoustic energy generated in the borehole 11 and the formation 12 by the firing of each transmitter $T_1$–$T_4$ will have fully decayed before the next transmitter is energized. Thus, in the preferred embodiment of the new and improved logging tool 10, the transmitter transducers $T_1$–$T_4$ are each energized at firing rates of 125-pulses per second which corresponds to a period X of approximately 2,000-microseconds between successive excitation pulses. Also, as illustrated in FIGS. 6A–6C, the borehole excitation signal, as at 45, produced by each transmitting transducer T is substantially terminated before any possible arrival of acoustic energy, as at 46, at its associated receiving transducer R. As a result of this as well as the small T-R spacings, S, and the hemispherically-directed broad-band receivers R, it has been found that the net acoustic energy received by each of the receiving transducers R after its respectively-associated transmitting transducer T has been fired will be a function substantially only of the attenuation of the acoustic energy in the earth formation 12 imposed by any impedance discontinuities such as fractures or the like, as at 33.

For example, as shown in FIG. 6B, a typical receiver output signal, as at 46, will exhibit a non-sinusoidal waveform whose frequency spectrum is broad and diverse which, as evidenced by its relatively unattenuated peaks, will be representative of no fractures lying between a particular one of the transmitting transducers T and its respectively associated receiving transducer R. Thus, the received signal 46 is characteristic of what will occur when the transmitting transducer $T_2$ is excited for propagating acoustic energy along the propagation path 30 to the receiving transducer $R_3$. On the other hand, where the propagation path, as at 29, is intersected by a discontinuity, such as the fracture 33, lying between the transducers $T_1$ and $R_2$, the resulting highly-attenuated receiver output signal will be similar to that shown at 47 in FIG. 6C. It will be appreciated, of course, by comparison of the waveforms of the output signals 46 and 47 that this latter signal exhibits a substantial attenuation in relation to the first signal.

Figure 7:
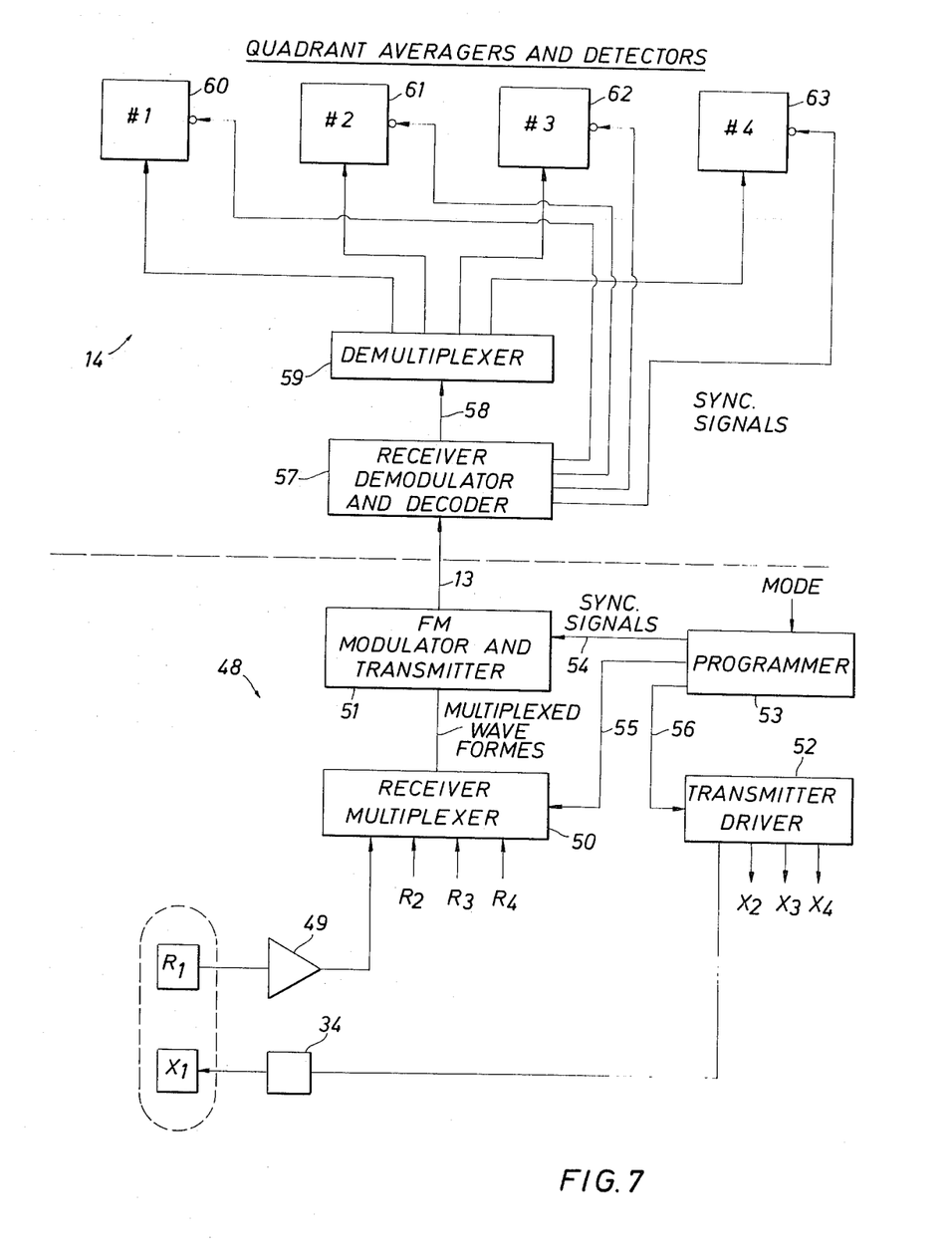
FIG. 7 shows a preferred embodiment of the surface and downhole electronic circuitry employed in the present invention.

Turning now to FIG. 7, a schematic representation is depicted of a preferred embodiment of the surface equipment 14 as well as the subsurface circuitry 48 of the new and improved logging tool 10 of the present invention. As seen there, each of the receiving transducers $R_1$–$R_4$ is cooperatively coupled by a broad-band amplifier 49 having a high input impedance to one of the four inputs of a receiver multiplexer 50 which is cooperatively arranged for time multiplexing each of the four output signals respectively produced by the four receiving transducers $R_1$–$R_4$. The output of the multiplexer 50 is coupled to a suitable frequency-modulation modulator and transmitter 51 for transmitting the multiplexed signals to the surface equipment 14 by way of the conductors in the suspension cable 13. Each of the several transmitting transducers $T_1$–$T_4$ are respectively excited by a broad-band exciter (as schematically depicted at 31 in FIG. 4) under the control of a transmitter driver 52. To control the sequential operation of the several components comprising the subsurface circuitry 48, a mode-and-timing programmer 53 is coupled by conductors 54–56 to supply synchronizing signals to the modulator-transmitter 51, the receiver multiplexer 50 and the transmitter driver 52.

In its preferred embodiment, the surface equipment 14 employed in practicing the present invention is comprised of a receiver demodulator and decoder 57 which is coupled to the several conductors of the suspension cable 13 and cooperatively arranged for demodulating the four multiplexed receiver output signals and the synchronizing signals and applying these multiplexed signals, as by a conductor 58, to the input of the demultiplexer 59 for separating the individual waveforms from the four receiving transducers $R_1$–$R_4$. The outputs of the demultiplexer 59 are respectively coupled to suitable averaging-and-detecting circuits 60–63 which will subsequently be described in greater detail.

Accordingly, it will be appreciated that as the transmitting transducers $T_1$–$T_4$ are successively energized, each of the several receiving transducers $R_1$–$R_4$ will successively supply a representative signal to their respective inputs at the receiver multiplexer 50. These received waveforms will be respectively indicative of the attenuation of the acoustic shear-wave energy propagated along the several circumferential paths as at 29 and 30 (FIG. 3) for providing indications which are representative of the presence or absence of formation anomalies such as the fracture 33 which may be in or adjacent to the wall of the borehole 11 at the depth at which the tool is then located. Each of these several received signals are appropriately multiplexed and transmitted up the suspension cable 13 by the modulator-transmitter 51. Upon reaching the surface, the receiver demodulator-decoder 57 will supply the multiplexed signals to the demultiplexer 59 for separation and individual presentation at the several averagers-and-detectors 60–63. Thus, it will be appreciated that a logging record will be presented which, in its preferred form, will be a series of four meaningful traces on a suitable log record.

It will be recognized that as the new and improved logging tool 10 of the present invention is moved through the borehole 11, portions of the tool such as the cover plates (as at 21) on each of the extendible arm assemblies 18 will be in rubbing contact with the borehole walls. Thus, as is known by those skilled in the art, the resulting so-called "road noise" will be detected by each of the several receiving transducers $R_1$–$R_4$ so that their output signals which are respectively transmitted to the surface will be representative of both the acoustic energy and the noises which are present in the wide-band frequency spectrum of the several transducers. To eliminate the interference which would otherwise be created by such raod noises and typical system noises while preserving the spectrum of the received signals, it is preferred that the quadrant detecting circuits 60–63, respectively include signal-averaging circuitry 64 cooperatively arranged for creating replicas of the received acoustic waveforms which are free of such road and system noises. Signal averagers such as the "Model TDH-9 Waveform Eductor" sold by Princeton Applied Research of Princeton, N.J., or as described in an article on "Boxcar Detectors" in the June, 1971, issue of *Research/Development* can be used.

Figure 8:
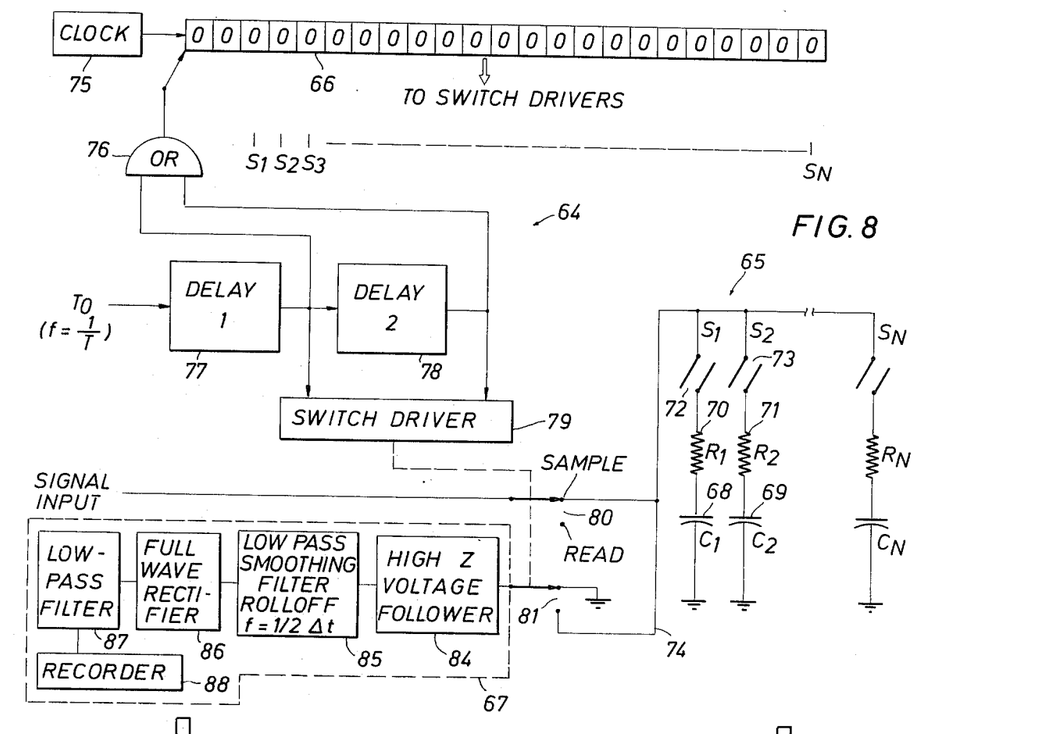
FIG. 8 depicts a typical arrangement of a portion of the surface circuitry shown in FIG. 7.

Accordingly, as shown in FIG. 8, a typical arrangement of each of the signal averagers 64 will provide for successively sampling selected portions of the demultiplexed receiver output signals being supplied thereto and averaging a substantial number of these successive samples for producing a noise-free replica of the true acoustic waveform detected by the receiver R associated therewith. In one manner of accomplishing this, the averaging circuit 64 may include a step-memorizer circuit 65 which is controlled by a resettable shift register 66 to sample the output signal from a given receiver R at spaced intervals each time the transmitter T associated therewith is fired. The accumulated cyclic samples are reproduced by a suitable detecting-and-recording circuit 67 as a noise-free waveform which is representative of the acoustic energy received by the receiver R.

A typical arrangement of the memorizer 65 will include a larger number of serially-connected capacitors, as at 68 and 69, and resistors, as at 70 and 71, which are respectively connected by means of normally-open switches, as at 72 and 73, to a common sample-read bus 74. The successive outputs of the shift register 66 are respectively connected to typical switch drivers (not shown) which successively operate the several switches as at 72 and 73. A sampling clock 75 is coupled to the clock input of the shift register 66 and an OR gate 76 is coupled to the data input of the shift register. The $T_0$ transmitter firing synchronizing signal from the decoder 57 is coupled by way of a first delay circuit 77 to one input of the OR gate 76; and, after passing through a second delay circuit 78, the synchronizing signal is coupled to a second input of the OR gate. The outputs of the delay circuits 77 and 78 are also respectively coupled to a switch driver 79 which selectively controls a sampling switch 80 and a read switch 81 cooperatively arranged in the common bus 74.

Figure 9:
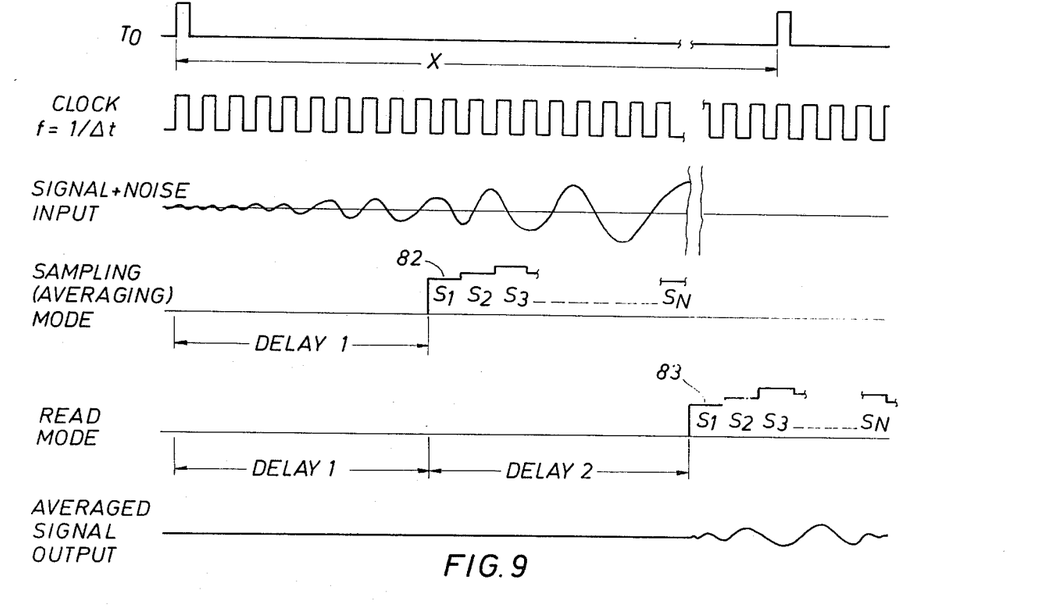
FIG. 9 shows typical signal waveforms as they may appear in various stages of the circuitry depicted in FIG. 8.

With the preferred embodiment of the logging tool 10 of the present invention, the delay circuit 77 will be cooperatively arranged to initiate the sampling sequence at some selected time following firing of the transmitter T associated with a given receiver R. Thus, as depicted in FIGS. 8 and 9, as a receiver signal is received at the signal input of the circuitry 64, the sampling switch 80 will be closed after a first predetermined time delay following the firing of the transmitter T associated with the particular receiver R. Also, as shown in FIGS. 8 and 9, the first time delay following the firing pulse or synchronizing pulse $T_0$ will enable the shift register 66 for successively closing and re-opening the memory switches, as at 72 and 73, so that as the signal waveform successively appears on the input of the bus 74, the memory switches will be momentarily closed and then re-opened in sequence as the clock 75 sequentially steps the shift register. Then, after the shift register 66 has been cycled for the first time and the delay period determined by the second delay circuit 78 has elapsed, the OR gate 76 will re-enable the shift register to again successively momentarily close and re-open each of the several memory switches, as at 72 and 73, in sequence. During this second cycle, however, the output signal from the second delay circuit 78 will be effective for opening the sampling switch 80 and closing the read switch 81 so that whatever voltages, as at 82, have been stored during previous sampling periods on the several capacitors, as at 68 and 69, will then be successively supplied to the detecting-and-recording circuit 67 as a plurality of step voltages as at 83. As will be subsequently explained, these successive step voltages, as at 83, are filtered for producing a continuous waveform, as at 84, which will be a substantially true replica of the received acoustic waveform but with the road and circuit noises effectively removed.

To understand the function of the averaging circuitry 64, the operation of the memorizer 65 should be considered during a number of successive "sampling" and "read" cycles. First of all, it will be recognized that since noise signals are typically erratic and random in their amplitude and frequency, if a large number of samples of a given replica of an acoustic waveform are successively obtained and then averaged, the result will be representative of the received acoustic waveform less such noises and other sporadic interferences. Thus, with the averaging circuitry 64, use is made in the present invention of an approximation of a classical averaging algorithm, which algorithm is as follows:

$$\text{Avg. Snew} = \text{Avg. Sold} + \text{Snew} - \text{Sold}/N$$

(Eq. 2)

where,

Avg. Snew = new value of averaged samples;
Avg. Sold = old value of averaged samples;
Snew = value of newest sample;
Sold = value of oldest sample; and
N = number of samples averaged.

It will be appreciated, however, that for finite values of these samples and where a substantial number of samples are averaged, Equation 2 can be sufficiently approximated by the following equation:

$$\text{Avg. Snew} = \text{Avg. Sold} + \text{Snew} - \text{Avg. Sold}/N$$

(Eq. 3)

Accordingly, with the circuitry 64, use is made of Equation 3 by arranging the memorizer 65 as the electrical analog of this equation. To appreciate this, it will be recognized that for each of the separate sections of the memorizer 65 (such as, for example, the capacitor 68, the resistor 70 and the switch 72), each time this switch is momentarily closed the current, I, flowing through the circuit will be equal to:

$$I = E_1 - E_2/R$$

(Eq. 4)

where, $I$ = current flow;
$E_1$ = value of voltage being sampled at that time;
$E_2$ = summation of the voltage $E_3$, previously stored on the capacitor 68 and the voltage change, $E_4$, which is produced during the closing of the switch 72; i.e., the net voltage stored on the capacitor; and
$R$ = value of the resistor 70.

The voltage change, $E_4$, is, of course, equal to:

$$E_4 = \frac{1}{C} \int_t^{t+\Delta t} I\,dt \quad \text{(Eq. 5)}$$

where, $C$ = value of the capacitor 68;
$t$ = time at which switch 72 is closed to begin the sampling of voltage $E_1$;
$t+\Delta t$ = time at which the switch 72 is opened to end the sampling of the voltage, $E_1$; and
$\Delta t$ = sampling interval.

Where $\Delta I/\Delta t$ is small, Equation 5 can be simplified and rewritten as follows:

$$E_4 \approx I\Delta t/C$$

(Eq. 6)

Substituting Equation 4 into Equation 6, $$E_4 \approx E_1 - E_2/RC\,\Delta t$$

(Eq. 7)

As previously mentioned, the voltage, $E_2$, appearing on the capacitor 68 each time a sample is obtained and the switch 72 is re-opened is equal to the summation of the voltages $E_3$ and $E_4$. Thus, using Equation 7 as an accurate approximation of the voltage $E_4$ and since $E_2$ is approximately equal to $E_3$ for small values of $\Delta I/\Delta t$ the voltage $E_2$ can be expressed as follows:

$$E_2 \approx E_3 + \Delta t/RC\,(E_1 - E_3)$$

(Eq. 8)

It will be seen, therefore, by comparison of Equation 3 and 8 that the several elements of the memorizer 65 are each sufficiently-accurate electrical analogs of the averaging algorithm defined in Equation 3. It should be noted that for the expression $\Delta I/\Delta t$ to be sufficiently small, $1/2\Delta\tau$ must be greater than the bandwidth of the receivers R.

It will be appreciated, therefore, that since the memorizer capacitors, as at 68 and 69, are not discharged during the "read" cycle of the averaging circuit 64, the voltage present at any time on any of these capacitors will be equivalent to the average of the voltages which had previously been stored thereon. The values of the capacitors, as at 68 and 69, and the resistors, as at 70 and 71 will, as shown in Equation 8, determine the charges which are respectively placed on the capacitors each time the switches, as at 72 and 73, are closed during the sampling interval $\Delta t$. Thus, after a given number of cycles (transmitter firings), the voltages present at any given time on the capacitors, as at 68 and 69, will represent noise-free samples of the true acoustic waveform provided that the rate of change of the true waveform is not too large due to excessive logging speeds. These noise-free signals will, of course, be supplied to the detecting-and-recording circuit 67.

It will, of course, be appreciated that the noise-free samples, as at 83, can be utilized in several manners for producing meaningful logging records. In the preferred embodiment of the present invention, however, the detecting-and-recording circuit 67 is comprised of a high-impedance voltage follower 84 which is coupled by way of a typical low-pass smoothing filter 85 and a full-wave rectifier 86 to another low-pass filter 87 and a suitable recorder 88. In this manner, the output of the filter 87 will provide indications which are representative of the average amplitude (DC component) of the total signal inputted thereto during the entirety of a given sampling interval. These output indications are, of course, proportional to the net energy received in this interval. The duration of the total sampling interval will, of course, be determined by the second delay circuit 78; and the starting time of the total sampling interval in relation to the synchronizing signal, $T_0$, will be established by the first delay circuit 77.

As an alternative to the above-described detecting-and-recording circuit 67, the low-pass filter 87 can be omitted and a non-inverting peak detector (not shown)

may be substituted in its place so that the recorder 88 will simply record a signal which is proportional to the amplitude of the maximum peak in the output waveform from the rectifier 86. It should be noted that in either arrangement, the recorder 88 would preferably be a single recording instrument providing individual traces from each of the several receivers $R_1$–$R_4$.

Accordingly, it will be appreciated that the present invention has provided new and improved methods and apparatus for investigating earth formations. In practicing the methods of the present invention, a sharp burst of broad-band acoustic energy of an extremely short duration is directed into a first location on a borehole wall for propagating acoustic waves into the adjacent earth formations, detecting the acoustic shear-wave energy propagated through the formation to a spaced second location on the borehole wall, and determining the attenuation of this shear-wave energy caused by its passage through the formations between the two spaced locations for detecting formation anomalies which may be present between these two locations.

As a preferred embodiment of apparatus for practicing the new and improved methods of the present invention, at least one pair of acoustic transducers are arranged for placement on spaced wall surfaces of a borehole. Excitation means are operatively arranged for energizing one of the transducers for producing a short burst or impulse of wideband acoustic energy which is directed into a first location in the adjacent earth formations for propagating shear waves through the formations toward a second location. Detecting means are coupled to the other of these transducers and operatively arranged for producing electrical signals representative of at least one detectable characteristic of the shear-wave energy propagated between the two locations which is representative of the nature of the earth formations.

While either practicing the methods of the present invention or using the disclosed new and improved apparatus of this invention, the duration of each burst of acoustic energy is selectively arranged to be less than $0.63\ t_cD - \mu$ seconds where D is the diameter of the borehole in inches.

While only a particular embodiment of the present invention and one mode of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for investigating acoustically-responsive characteristics of a well bore material defining a travel path for acoustic energy adjacent to a well bore wall and comprising the steps of:

directing broad band damped acoustic energy centered about a selected frequency into said well bore wall at one end of said travel path for only a selected time interval which is no greater than about 80 percent of the arithmetical product of the length of said travel path multiplied by the estimated travel time of compressional acoustic energy through said well bore material for developing a distinguishable shear-wave of acoustic energy having a predominant frequency content below said selected frequency to be propagated along said travel path through said well bore material; and detecting said shear-wave acoustic energy arriving at said well bore wall at the other end of said travel path for producing an electrical signal representative of the influence of said well bore material on the propagation of said shear-wave acoustic energy along said travel path.

2. The method of claim 1 wherein said predominant frequency content of said detected acoustic energy is no greater than about 100-KHz.

3. The method of claim 1 wherein said one end of said travel path and said other end of said travel path are circumferentially spaced on said well bore wall.

4. A method for investigating acoustically-responsive characteristics of a well bore material located between spaced locations on a well bore wall and comprising the steps of:

directing broad band damped acoustic energy centered about a selected frequency into said well bore wall at a first one of said spaced locations for only a selected time interval which is no greater than about 80 percent of the arithmetical product of the estimated travel time of compressional acoustic energy through said well bore material multiplied by the shortest distance along said well bore wall between said first location and a second one of said spaced locations for developing a distinguishable shear-wave of acoustic energy having a predominant frequency content below said selected frequency to be propagated through said well bore material between said first and second spaced locations; and detecting said shear-wave acoustic energy arriving at said second location for producing a first electrical signal representative of the influence of said well bore material on the propagation of said shear-wave acoustic energy between said first and second spaced locations.

5. The method of claim 4 wherein said predominant frequency content of said detected acoustic energy is no greater than about 100-KHz.

6. The method of claim 4 wherein said first and second spaced locations are circumferentially spaced from one another.

7. The method of claim 4 including the further steps of:

direction broad band damped acoustic energy centered about said selected frequency into said well bore walls at a third one of said spaced locations for only a selected time interval which is no greater than about 80 percent of the arithmetical product of the estimated travel time of compressional acoustic energy through said well bore material multiplied by the shortest distance along said well bore wall between said third location and a fourth one of said spaced locations for developing a distinguishable shear-wave of acoustic energy having a predominant frequency content below said selected frequency to be propagated through said well bore material between said third and fourth spaced locations; and detecting said shear-wave acoustic energy arriving at said fourth location for producing a second electrical signal representative of the influence of said well bore material on the propagation of said shear-wave acoustic energy between said third and fourth spaced locations.

8. The method of claim 7 wherein said first and second spaced locations are circumferentially spaced from one another, and said third and fourth spaced locations are circumferentially spaced from one another.

9. The method of claim 8 wherein the circumferential spacing between said first and second spaced locations is equal to the circumferential spacing between said third and fourth spaced locations.

10. The method of claim 8 wherein said first spaced location is spaced from said third spaced location.

11. The method of claim 8 wherein the circumferential spacing between said first and second spaced locations is equal to the circumferential spacing between said third and fourth spaced locations, and said first spaced location is spaced circumferentially from said third spaced location.

12. The method of claim 8 wherein said first and third spaced locations are circumferentially spaced, said second spaced location is located at a selected circumferential distance in one direction around said well bore wall from said first spaced location, and said fourth spaced location is located at said selected circumferential distance in the opposite direction around said well bore wall from said third spaced location.

13. The method of claim 12 wherein said selected circumferential distance is about one-fourth of the circumference of said well bore wall.

14. The method of claim 13 wherein said predominant frequency content of said detected acoustic energy is no greater than about 100-KHz.

15. A method for locating formation anomalies which are effective for impairing the circumferentially-directed propagation of shear-wave acoustic energy through earth formations surrounding a borehole and between circumferentially-spaced locations on the wall of said borehole, and comprising the steps of:
    radially directing into at least one of said spaced locations a successive series of broad band damped pulses of acoustic energy centered about a selected frequency respectively having a pulse duration no greater than about 80 percent of the arithmetical product of the estimated travel time of compressional acoustic energy through said earth formations multiplied by the shortest arcuate distance between any two adjacent spaced locations for developing a series of successive distinguishable shear-waves of acoustic energy having a predominant frequency content below said selected frequency in said earth formations to be propagated along a path from said one spaced location;
    repetitively detecting said successive shear-waves of acoustic energy arriving at at least one other of said spaced locations for successively producing electrical signals representative of the shear-wave acoustic energy successively arriving thereat; and
    repetitively comparing said electrical signals for detecting the presence of such formation anomalies lying between said spaced locations.

16. The method of claim 15 wherein said predominant frequency content of said detected acoustic energy is no greater than about 100-KHz.

17. The method of claim 15 wherein said successive waves of acoustic energy are detected at first and second ones of said spaced locations for producing first and second ones of said electrical signals for comparison to determine whether such formation anomalies are lying between said first and second locations and said one location.

18. The method of claim 15 wherein a first group of said series of broad band damped acoustic pulses are directed into a first one of said spaced locations and said successive shear-waves of acoustic energy developed from said first group of broad band damped acoustic pulses are detected at a second one of said spaced locations for producing a first electrical signal representative of the shear-wave acoustic energy successively propagated through said earth formations between said first and second spaced locations, and wherein a second group of said series of broad band damped acoustic pulses are directed into a third one of said spaced locations and said successive shear-waves of acoustic energy developed from said second group of broad band damped acoustic pulses are detected at a fourth one of said spaced locations for producing a second electrical signal representative of the shear-wave acoustic energy successively propagated through said earth formations between said third and fourth spaced locations for comparison with first electrical signal to determine whether such formation anomalies are present between either said first and second spaced locations or said third and fourth spaced locations.

19. The method of claim 18 wherein said first and second spaced locations are about 90° apart and said third and fourth spaced locations are about 90° apart.

20. The method of claim 18 wherein said first and third spaced locations are about 180° apart and said second and fourth spaced locations are about 180° apart.

21. The method of claim 20 wherein said second and fourth locations are about 90° apart from said first and third locations respectively.

22. A method for locating formation anomalies which are effective for impairing the circumferentially-directed propagation of shear-wave acoustic energy through earth formations surrounding a borehole and between N equally-spaced circumferentially-distributed locations on the wall of said borehole, and comprising the steps of:
    sequentially directing into each of said spaced locations a broad band damped pulse of acoustic energy centered about a selected frequency and having a pulse duration in $\mu$ seconds no greater than about the arithmetical product of $0.8\pi t_c$, wherein $t_c$ equals the estimated travel time of compressional energy through said earth formations, times the diameter of said borehole in inches for successively developing a corresponding shear-wave of acoustic energy having a predominant frequency content below said selected frequency in said earth formations to be propagated along a path from each of said spaced locations toward the next-adjacent one of said spaced locations;
    sequentially detecting said corresponding shear-wave of acoustic energy as it arrives at said next-adjacent one of said spaced locations for successively producing N electrical signals respectively representative of the shear-wave acoustic energy traveling circumferentially in said earth formations lying in each of the N sectors of said earth formations surrounding said borehole; and comparing said electrical signals for detecting the presence of such formation anomalies respectively in said sectors of said earth formations.

23. The method of claim 22 wherein said predominant frequency content of said detected acoustic energy is no greater than about 100-KHz.

24. The method of claim 22 wherein N is equal to four.

25. The method of claim 22 wherein each of said successively broad band damped pulses occurs at about 2,000 $\mu$ seconds following the immediately-preceding one of said damped pulses.

26. The method of claim 25 wherein N is equal to four.

27. The method of claim 22 wherein the next one of each of said broad band damped pulses is directed into said next-adjacent one of said spaced locations following the reception thereat of acoustic energy developed from the immediately-preceding broad band damped pulse for progressively exploring the perimeter of said borehole wall in a uniform fashion.

28. The method of claim 22 wherein said broad band damped pulses are respectively directed along axes of transmission which are substantially normal to said borehole wall at their respective spaced locations for minimizing the propagation of compressional-wave energy toward the others of said spaced locations.

29. The method of claim 22 further including the step of:
successively recording said electrical signals as a function of the depth of said borehole for producing a logging record representative of such formation anomalies in each of said sectors of said earth formations versus depth.

30. Apparatus adapted for investigating acoustically-responsive characteristics of well bore material and comprising:
a body adapted for suspension in a well bore;
first acoustic transducer means having a low mechanical Q cooperatively arranged on said body and adapted for directing a pulse of damped acoustic energy centered about a selected frequency toward a first location on a well bore wall;
second acoustic transducer means having a low mechanical Q cooperatively arranged on said body and adapted for detecting acoustic energy having a predominant frequency content below said selected frequency and arriving from a second location on a well bore wall spatially disposed at a selected distance from said first location;
transducer-driving means cooperatively arranged to drive said first transducer means for only a selected time interval such that said damped pulse is no greater than about 80 percent of the arithmetical product of the estimated travel time of compressional acoustic energy through such well bore material multiplied by the length of the shortest path through such well bore material between said first and second spaced locations for developing a distinguishable shear-wave of acoustic energy propagated along said path through such well bore material between said first and second spaced locations; and
circuit means coupled to said second transducer means and cooperatively arranged for producing an electrical signal representative of the influence of such well bore material on the propagation of shear-wave acoustic energy along said path between said spaced locations.

31. The apparatus of claim 30 wherein said first and second acoustic transducer means are respectively directed along outwardly-diverging first and second operating axes.

32. The apparatus of claim 30 wherein said predominant frequency content detected by said second transducer means is no greater than about 100-KHz.

33. The apparatus of claim 30 wherein said first and second acoustic transducer means are respectively directed along outwardly-diverging first and second operating axes substantially lying in a common plane perpendicular to the longitudinal axis of said body so that said path will substantially lie in said common plane.

34. The apparatus of claim 33 wherein said first and second operating axes are substantially at right angles to one another.

35. Apparatus adapted for locating formation anomalies which are effective for impairing the circumferentially-directed propagation of shear-wave acoustic energy through earth formations surrounding a borehole and comprising:
a body adapted for suspension in a borehole;
acoustic transmitting means on said body, having a low mechanical Q and cooperatively arranged for directing pulses of damped acoustic energy centered about a selected frequency into a borehole wall for developing shear-wave acoustic energy along N equal paths through such earth formations to a corresponding number circumferentially-spaced locations on a borehole wall;
acoustic receiving means on said body, having a low mechanical Q and cooperatively arranged for selectively detecting acoustic energy having a predominant frequency content below said selected frequency and respectively arriving at said spaced locations;
first circuit means cooperatively arranged to successively drive said acoustic transmitting means for only selected time intervals such that said damped pulses are each no greater than about 80 percent of the arithmetical product of the estimated travel time of compressional acoustic energy through such earth formations multiplied by the length of one of said equal paths such that a series of successive distinguishable shear-waves of acoustic energy are propagated along said equal paths to said spaced locations respectively; and
second circuit means cooperatively arranged for producing N electrical signals respectively representative of the shear-wave acoustic energy respectively arriving at said spaced locations.

36. The apparatus of claim 35 wherein said acoustic receiving means include first and second acoustic receiving transducers respectively directed outwardly along separate first and second operating axes intersecting first and second ones of said spaced locations respectively.

37. The apparatus of claim 36 wherein the angle defined by said first and second axes is at least about 90°.

38. The apparatus of claim 35 wherein said acoustic receiving means include first and second acoustic receiving transducers respectively directed outwardly along separate first and second receiving axes intersecting first and second ones of said spaced locations respectively; and said acoustic transmitting means include first and second acoustic transmitting transducers respectively directed outwardly along separate first and second transmitting axes which are respectively divergent in relation to said first and second receiving axes.

39. The apparatus of claim 35 further including:
recording means cooperatively coupled to said second circuit means and adapted for individually recording said electrical signals as a function of the depth of said acoustic transmitting means and acoustic receiving means as they are being operated.

40. The apparatus of claim 35 wherein said acoustic receiving means includes N acoustic receiving transducers uniformly arranged around said body and respectively directed along individual receiving axes at equal angles to one another; and said acoustic transmitting means include N acoustic transmitting transducers uniformly arranged around said body and respectively directed along individual transmitting axes at equal angles to one another to respectively position each of said transmitting transducers at a uniform circumferential distance from an associated one of said receiving transducers.

41. The apparatus of claim 40 wherein N equals four.

42. The apparatus of claim 40 wherein N equals four and each of said transmitting transducers is respectively directed along a transmitting axis that is at right angles to the receiving axis of a given one of said receiving transducers for positioning each associated pair of said receiving and transmitting transducers at 90° from one another.

43. The apparatus of claim 30 wherein mechanical Q is less than 1.0.

44. The apparatus of claim 35 wherein mechanical Q is less than 1.0.

* * * * *